(12) United States Patent
Tang et al.

(10) Patent No.: US 12,163,856 B1
(45) Date of Patent: Dec. 10, 2024

(54) MULTIFUNCTIONAL ROTARY BLOWOUT PREVENTER TEST DEVICE AND METHOD THEREOF

(71) Applicants: Sichuan Hongda Security Technology Service Co., Ltd, Deyang (CN); Sichuan Kete Testing Technology Co., Ltd, Deyang (CN)

(72) Inventors: Shundong Tang, Deyang (CN); Gang Wang, Deyang (CN); Ketao Cai, Deyang (CN); Yonggang Deng, Deyang (CN); Shaowei Chen, Deyang (CN); Ronghua Wang, Deyang (CN); Zhe Wang, Deyang (CN); Xudong Wang, Deyang (CN); Yuke You, Deyang (CN); Shanji Wang, Deyang (CN); Ming Huang, Deyang (CN); Jian Zhang, Deyang (CN); Hanjun Liu, Deyang (CN); Yuan Gao, Deyang (CN)

(73) Assignees: Sichuan Hongda Security Technology Service Co., Ltd, Deyang (CN); Sichuan Kete Testing Technology Co., Ltd, Deyang (CN)

( * ) Notice: Subject to any disclaimer, the term of this patent is extended or adjusted under 35 U.S.C. 154(b) by 0 days.

(21) Appl. No.: 18/676,580

(22) Filed: May 29, 2024

(30) Foreign Application Priority Data

Aug. 28, 2023 (CN) .......................... 202311084735.2

(51) Int. Cl.
*G01M 13/003* (2019.01)
*E21B 33/08* (2006.01)

(52) U.S. Cl.
CPC ......... *G01M 13/003* (2019.01); *E21B 33/085* (2013.01)

(58) Field of Classification Search
None
See application file for complete search history.

(56) References Cited

U.S. PATENT DOCUMENTS

| 10,273,775 B2 * | 4/2019 | Cruickshanks | ....... E21B 34/045 |
| 2021/0247262 A1 * | 8/2021 | Livesay | ................ G01M 3/002 |
| 2021/0277738 A1 * | 9/2021 | Mukhlifi | ................. E21B 33/06 |

FOREIGN PATENT DOCUMENTS

CN 216978341 U 7/2022

* cited by examiner

*Primary Examiner* — Patrick Assouad
*Assistant Examiner* — Mark A Shabman
(74) *Attorney, Agent, or Firm* — Jeenam Park

(57) ABSTRACT

A multifunctional rotary blowout preventer test device and a method thereof are provided. The device includes a test box body and a rotary blowout preventer body, a base is fixedly connected inside the test box body with screws, and two first receiving blocks are fixedly connected to a top of the base with screws. Through the arrangement of the structures such as a motor and an output shaft, the motor is started, the output shaft is driven to rotate, a rotating rod is driven to rotate, a forward-rotating screw rod and a reverse-rotating screw rod are driven to rotate, a right-moving sliding block and a left-moving sliding block are driven to move.

9 Claims, 9 Drawing Sheets

MULTIFUNCTIONAL ROTARY BLOWOUT PREVENTER TEST DEVICE AND METHOD THEREOF

CROSS-REFERENCE TO RELATED APPLICATIONS

This application claims priority to Chinese Patent Application No. 202311084735.2, filed on Aug. 28, 2023, which is hereby incorporated by reference in its entirety.

TECHNICAL FIELD

The present invention relates to the technical field of blowout preventer test devices, and in particular to a multifunctional rotary blowout preventer test device and a method thereof.

BACKGROUND

Currently, rotary blowout preventers are commonly used during drilling. At present, there are various types of rotary blowout preventers, which have similar functions and aim to seal a rotary pipe string within a certain pressure range. In general, the drilling process lasts for a long time, which requires that a rotary blowout preventer can adapt to long-time pressurized rotation, a torque during the entire process should not be too large because excessive torque will reduce drilling efficiency, and a temperature should not be too high because the too high temperature will reduce the service life of the seal.

In the prior art, the utility model with Patent No. CN216978341U and entitled "MULTIFUNCTIONAL ROTARY BLOWOUT PREVENTER TEST DEVICE" discloses a multifunctional rotary blowout preventer test device, which comprises a test host machine and an information acquisition system, wherein the test host machine comprises a rack, a drive unit, a transmission assembly, a test mandrel and a pressurizing unit, the drive unit is mounted at a top of the rack, an output end of the drive unit is downwards connected to the test mandrel through the transmission assembly, the test mandrel passes into a to-be-tested rotary blowout preventer, and the pressurizing unit is communicated with a sealed cavity of the rotary blowout preventer; the information acquisition system comprises a torque sensor, a temperature sensor, a signal acquisition box and a test computer, the torque sensor is mounted between the transmission assembly and the test mandrel, a measuring end of the temperature sensor is close to a mounting groove of a rotary blowout preventer sealing ring, the torque sensor and the temperature sensor are connected to the signal acquisition box, and the signal acquisition box is connected to the test computer. The multifunctional rotary blowout preventer test device of this utility model simulates a drilling environment and achieves the acquisition and recording of working parameters in the rotating process of the rotary blowout preventer; however, when the multifunctional rotary blowout preventer test device is used, excessive manual intervention is required to lock this device, and the automation degree is poor; the multifunctional rotary blowout preventer test device is placed outside, which cannot be sufficiently protected; and when the multifunctional rotary blowout preventer test device is used for the rotary test, vibration can be caused, and the receiving block can be loosened.

SUMMARY

The present invention provides a multifunctional rotary blowout preventer test device and a method thereof, which solves the problems of poor automation degree, insufficient protection, and vibration and looseness in the related technology.

A technical solution of the present invention is as follows: a multifunctional rotary blowout preventer test device comprises a test box body and a rotary blowout preventer body, wherein a base is fixedly connected inside the test box body through screws, two symmetrically arranged first receiving blocks are fixedly connected to a top of the base through screws, a motor box is fixedly connected to one side of the base through screws, a motor is mounted inside the motor box, an output end of the motor is connected to a coaxially arranged output shaft through a coupler, two symmetrically arranged driving sector gears are fixedly sleeved on an outer peripheral surface of the output shaft, a forward-rotating screw rod and a reverse-rotating screw rod are fixedly connected to the output shaft through screws, a right-moving sliding block and a left-moving sliding block are respectively threaded on outer peripheral surfaces of the forward-rotating screw rod and the reverse-rotating screw rod, a left-moving sliding seat and a right-moving sliding seat are respectively and fixedly connected to tops of the right-moving sliding block and the left-moving sliding block through screws, a right-moving sealing block and a left-moving sealing block are respectively and fixedly connected to tops of the right-moving sliding seat and the left-moving sliding seat through screws, one side of each of the right-moving sealing block and the left-moving sealing block is provided with a sealing gasket, a rotating rod is rotatably mounted inside each of the two first receiving blocks, a driven sector gear is fixedly sleeved on an outer peripheral surface of the rotating rod, the two driving sector gears are respectively engaged with the two driven sector gears, a top of each of the two rotating rods is fixedly connected to a threaded rod through screws, and a second receiving block is threaded on an outer peripheral surface of each of the two threaded rods; and an observation window is provided at one side of the test box body, the two second receiving blocks are jointly and fixedly connected to a top connecting block on one side through screws, a drive device body is mounted on a top of the top connecting block, a power assembly is mounted at an output end of the drive device body, a test mandrel is mounted at a bottom of the power assembly, a connecting device body is mounted at a bottom of the test mandrel, one side of each of the two second receiving blocks is fixedly connected to two second connecting blocks through screws, a vibration sensor is mounted on one side of each of the four second connecting blocks, a clamping block is slidably assembled in each of the second connecting blocks, a shock absorber is mounted on an outer peripheral surface of the clamping block, the other end of each of the clamping blocks is fixedly connected to a first connecting block through screws, the other ends of the two first connecting blocks are fixedly connected to two sides of the test mandrel through screws, the other ends of the other two first connecting blocks are fixedly connected to a bottom of the connecting device body through screws, and the connecting device body is connected to a top of the rotary blowout preventer body.

Preferably, a first concave wheel is fixedly sleeved on the outer peripheral surface of the output shaft, a follower rod is rotatably mounted inside the test box body, a second concave wheel and two symmetrically arranged driving bevel gears are fixedly sleeved on an outer peripheral surface of the follower rod, a transmission belt is mounted on outer peripheral surfaces of the first concave wheel and the second concave wheel, a plurality of driven rods uniformly distributed are rotatably mounted inside the test box body, two symmetrically arranged toothed belts are jointly mounted on outer peripheral surfaces of the plurality of driven rods, driven bevel gears are respectively and fixedly sleeved on the outer peripheral surfaces of the two driven rods, the two driving bevel gears are respectively engaged with the two driven bevel gears, two symmetrically arranged sliding doors are slidably assembled inside the test box body, a toothed block is fixedly connected to a bottom of each of the sliding doors through screws, the toothed belt is engaged with the toothed block, and a magnetic strip is arranged on one side of the sliding door.

Preferably, a through groove is formed inside the motor box, the output shaft is rotatably mounted inside the through groove, a square groove is formed inside the motor box, the transmission belt passes through inside of the square groove, and the through groove is used for rotation of the output shaft.

Preferably, a hole groove is formed inside the base, the output shaft is rotatably mounted inside the hole groove, two symmetrically arranged rotating grooves are formed inside the base, the two driving sector gears and the two driven sector gears are rotatably mounted inside the rotating grooves, and the hole groove is used for rotation of the output shaft.

Preferably, a forward-rotating threaded groove I is formed inside the right-moving sliding block, a reverse-rotating threaded groove I is formed inside the left-moving sliding block, the forward-rotating screw rod and the reverse-rotating screw rod are respectively in threaded connection with an interior of the forward-rotating threaded groove I and an interior of the reverse-rotating threaded groove I, and the forward-rotating threaded groove I is used to move the right-moving sliding block.

Preferably, a chute is formed inside the first receiving block, the first receiving block is slidably connected inside the chute, a forward-rotating threaded groove II is formed inside the second receiving block, the threaded rod is in threaded connection with an interior of the forward-rotating threaded groove II, and the chute is used for sliding connection of the first receiving block.

Preferably, a sliding groove is formed inside the test box body, the sliding door is slidably connected inside the sliding groove, a circular hole is formed inside the top connecting block, the power assembly passes through inside of the circular hole, and the sliding groove is used for sliding closing of the sliding door.

Preferably, a clamping groove is formed inside the first connecting block, the clamping block is slidably connected inside the clamping groove, two heteroideus grooves are formed inside the test box body, the toothed belt is rotatably mounted inside the two heteroideus grooves, and the clamping groove is used for sliding connection of a clamping block.

A use method of a multifunctional rotary blowout preventer test device adopts the aforementioned multifunctional rotary blowout preventer test device and comprises the following steps:

S1: manually placing the rotary blowout preventer body between the right-moving sliding block and the left-moving sliding block;

S2: withdrawing personnel out of the test box body, remotely controlling to start the forward rotation of the motor, enabling the right-moving sliding block, the left-moving sliding block, the right-moving sliding seat, the left-moving sliding seat, the right-moving sealing block and the left-moving sealing block to move by the rotation of the motor, and clamping the rotary blowout preventer;

S3: when the motor rotates, driving the second connecting block to clamp into the first receiving block;

S4: after the connection and mounting are completed, remotely opening the drive device body, turning on the pressurizing unit, performing a rotary test on the interior, and observing the test condition from an external connector; and S5: after the test is completed, remotely controlling the reverse rotation of the motor, loosening the rotary blowout preventer body, and manually moving away the rotary blowout preventer body.

The working principle and beneficial effects of the present invention are as follows:

1. According to the present invention, through the arrangement of the structures such as the motor and the output shaft, the motor is started, the output shaft is driven to rotate, the rotating rod is driven to rotate, the forward-rotating screw rod and the reverse-rotating screw rod are driven to rotate, the right-moving sliding block, the left-moving sliding block, the right-moving sealing block and the left-moving sealing block are driven to move, the rotary blowout preventer body is clamped; and meanwhile, the threaded rod is driven to rotate, the second receiving block is driven to descend, and the connecting device body is driven to connect to the rotary blowout preventer, so that the automation degree is high.

2. According to the present invention, through the arrangement of the structures such as the test box body and the sliding doors, when the motor is started, the transmission belt is driven to rotate, the follower rod is driven to rotate, the driving bevel gear is driven to rotate, the driven bevel gear is driven to rotate, the driven rod is driven to rotate, the toothed belt is driven to rotate, the toothed block is driven to rotate, the sliding doors are driven to move relatively, and when the two sliding doors are connected, sealing is achieved by the magnetic strips, so that the safety of personnel is protected.

3. According to the present invention, through the arrangement of the structures such as the first connecting block and the clamping block, when the drive device body is subjected to the rotary test, vibration can be caused, the first connecting block can be loosened due to long-time vibration, and the vibration can be relieved through the clamping blocks and the shock absorbers in the first connecting block and the second connecting block, so that the entire operation life of the device is greatly prolonged.

BRIEF DESCRIPTION OF DRAWINGS

The present invention will be further described in detail below in conjunction with the accompanying drawings and specific embodiments.

Figure 1:
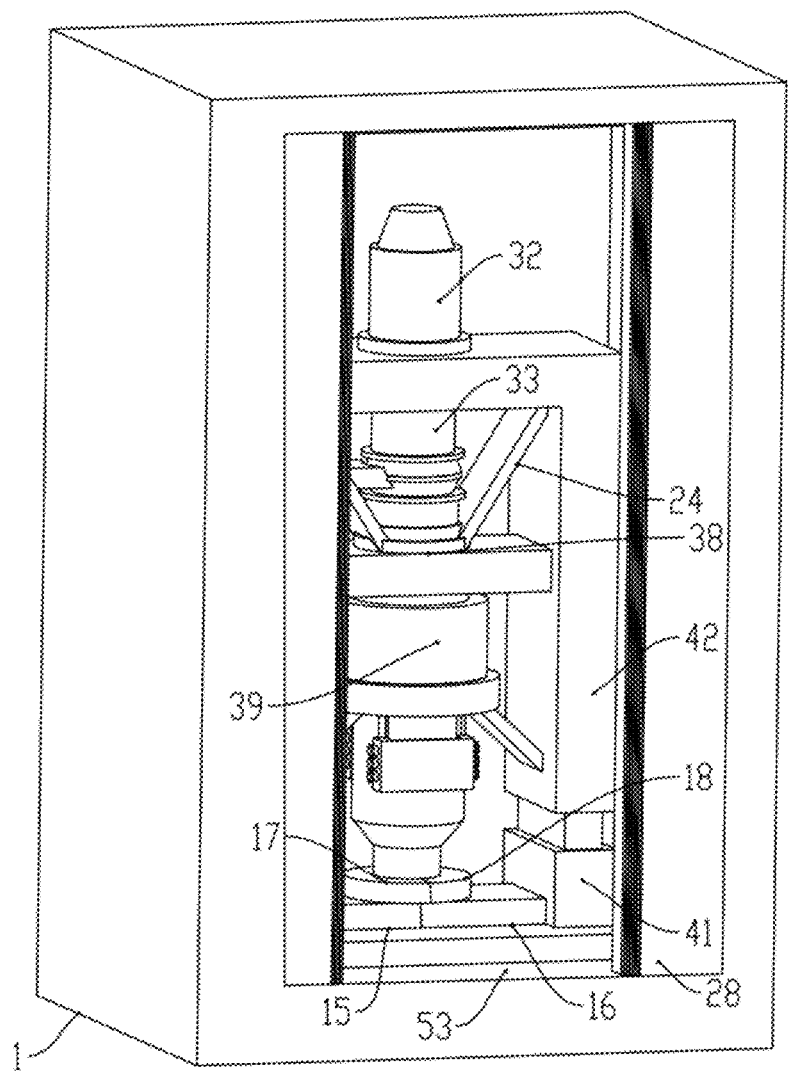
FIG. 1 is a schematic diagram of an overall structure of a test box body according to the present invention.
Figure 2:
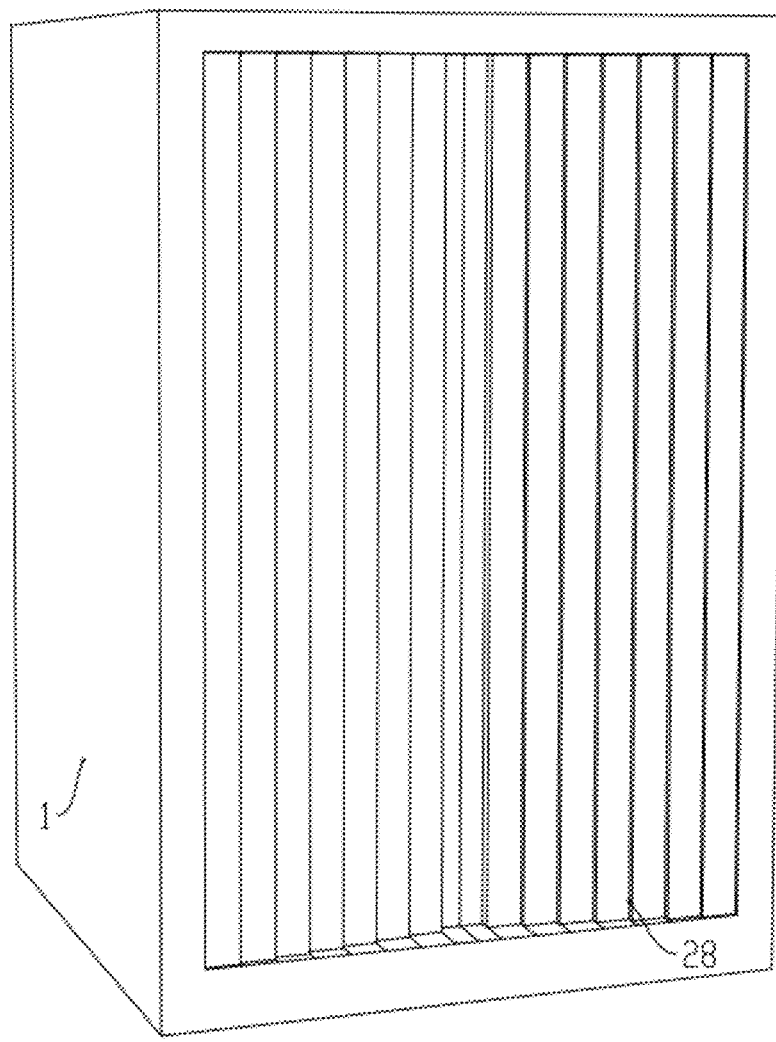
FIG. 2 is a schematic diagram of an overall structure of a sliding door according to the present invention.
Figure 3:
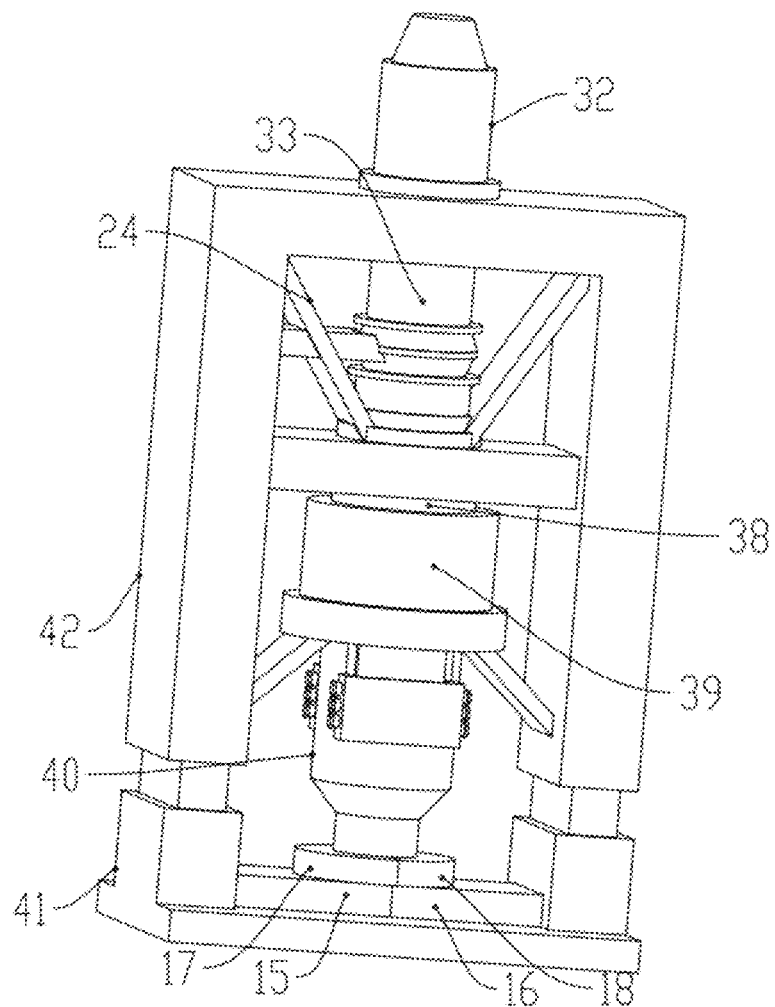
FIG. 3 is a schematic diagram of an internal overall structure of a test box body according to the present invention.
Figure 4:
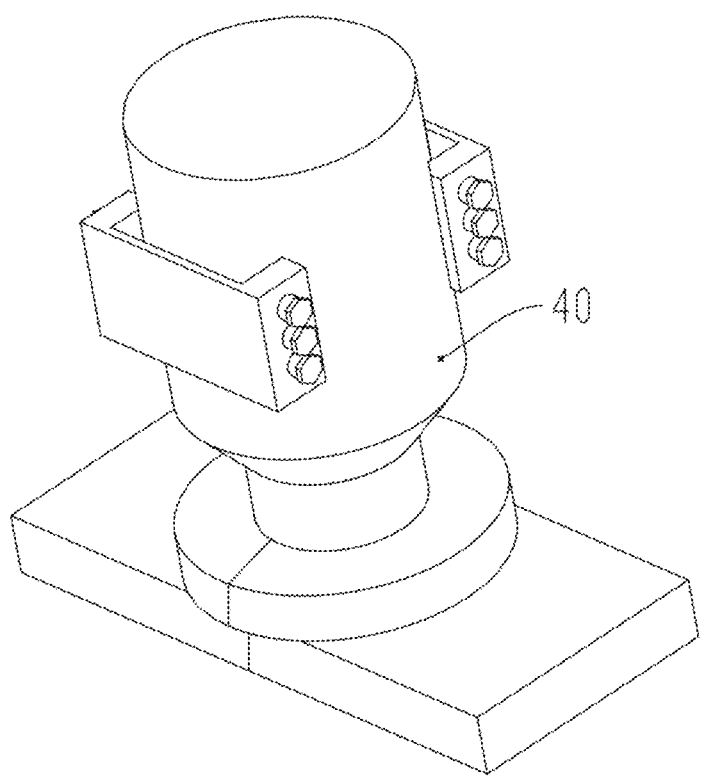
FIG. 4 is a schematic diagram of an overall structure of a rotary blowout preventer body according to the present invention.

Reference numerals: 1: test box body; 2: observation window; 3: base; 4: motor box; 5: motor; 6: output shaft; 7: driving sector gear; 8: driven sector gear; 9: rotating rod; 10: threaded rod; 11: forward-rotating screw rod; 12: reverse-rotating screw rod; 13: right-moving sliding block; 14: left-moving sliding block; 15: right-moving sliding seat; 16: left-moving sliding seat; 17: right-moving sealing block; 18: left-moving sealing block; 19: first concave wheel; 20: sealing gasket; 21: second concave wheel; 22: transmission belt; 23: follower rod; 24: driving bevel gear; 25: driven rod; 26: driven bevel gear; 27: toothed belt; 28: sliding door; 29: toothed block; 30: magnetic strip; 31: first connection block; 32: drive device body; 33: power assembly; 34: second connecting block; 35: clamping block; 36: shock absorber; 37: vibration sensor; 38. test mandrel; 39: connecting device body; 40: rotary blowout preventer body; 41: first receiving block; 42: second receiving block; 43: top connecting block; 44: coupler; 45: through groove; 46: square groove; 47: hole groove; 48: rotating groove; 49: forward-rotating threaded groove I; 50: reverse-rotating threaded groove; 51: chute; 52: forward-rotating threaded groove II, 53: sliding groove; 54: circular hole; 55: clamping groove; and 56: heteroideus groove.

DESCRIPTION OF EMBODIMENTS

The following clearly and completely describes the technical solutions in embodiments of the present invention with reference to embodiments of the present invention. It is clear that the described embodiments are merely a part rather than all of embodiments of the present invention. All other embodiments obtained by those of ordinary skill in the art based on embodiments of the present invention without creative efforts shall relate to the protection scope of the present invention.

Embodiment 1

As shown in FIG. 1 to FIG. 12, this embodiment provides a multifunctional rotary blowout preventer test device, which comprises a test box body 1 and a rotary blowout preventer body 40, wherein a base 3 is fixedly connected inside the test box body 1 through screws, two symmetrically arranged first receiving blocks 41 are fixedly connected to a top of the base 3 through screws, a motor box 4 is fixedly connected to one side of the base 3 through screws, a motor 5 is mounted inside the motor box 4, an output end of the motor 5 is connected to a coaxially arranged output shaft 6 through a coupler 44, two symmetrically arranged driving sector gears 7 are fixedly sleeved on an outer peripheral surface of the output shaft 6, a forward-rotating screw rod 11 and a reverse-rotating screw rod 12 are fixedly connected to the output shaft 6 through screws, a right-moving sliding block 13 and a left-moving sliding block 14 are respectively threaded on outer peripheral surfaces of the forward-rotating screw rod 11 and the reverse-rotating screw rod 12, a left-moving sliding seat 16 and a right-moving sliding seat 15 are respectively and fixedly connected to tops of the right-moving sliding block 13 and the left-moving sliding block 14 through screws, a right-moving sealing block 17 and a left-moving sealing block 18 are respectively and fixedly connected to tops of the right-moving sliding seat 15 and the left-moving sliding seat 16 through screws, one side of each of the right-moving sealing block 17 and the left-moving sealing block 18 is provided with a sealing gasket 20, a rotating rod 9 is rotatably mounted inside each of the two first receiving blocks 41, a driven sector gear 8 is fixedly sleeved on an outer peripheral surface of the rotating rod 9, the two driving sector gears 7 are respectively engaged with the two driven sector gears 8, a top of each of the two rotating rods 9 is fixedly connected to a threaded rod 10 through screws, a second receiving block 42 is threaded on an outer peripheral surface of each of the two threaded rods 10, and the connecting device body 39 is connected to a top of the rotary blowout preventer body 40. Through the arrangement of the structures such as the motor 5 and the output shaft 6, the motor 5 is started, the output shaft 6 is driven to rotate, the rotating rod 9 is driven to rotate, the forward-rotating screw rod 11 and the reverse-rotating screw rod 12 are driven to rotate, the right-moving sliding block 13, the left-moving sliding block 14, the right-moving sealing block 17 and the left-moving sealing block 18 are driven to move, the rotary blowout preventer body 40 is clamped; and meanwhile, the threaded rod 10 is driven to rotate, the second receiving block 42 is driven to descend, and the connecting device body 39 is driven to connect to the rotary blowout preventer, so that the automation degree is high.

As shown in FIG. 5 to FIG. 12, a hole groove 47 is formed inside the base 3, the output shaft 6 is rotatably mounted inside the hole groove 47, two symmetrically arranged rotating grooves 48 are formed inside the base 3, and the two driving sector gears 7 and the two driven sector gears 8 are rotatably mounted inside the rotating grooves 48.

Figure 5:
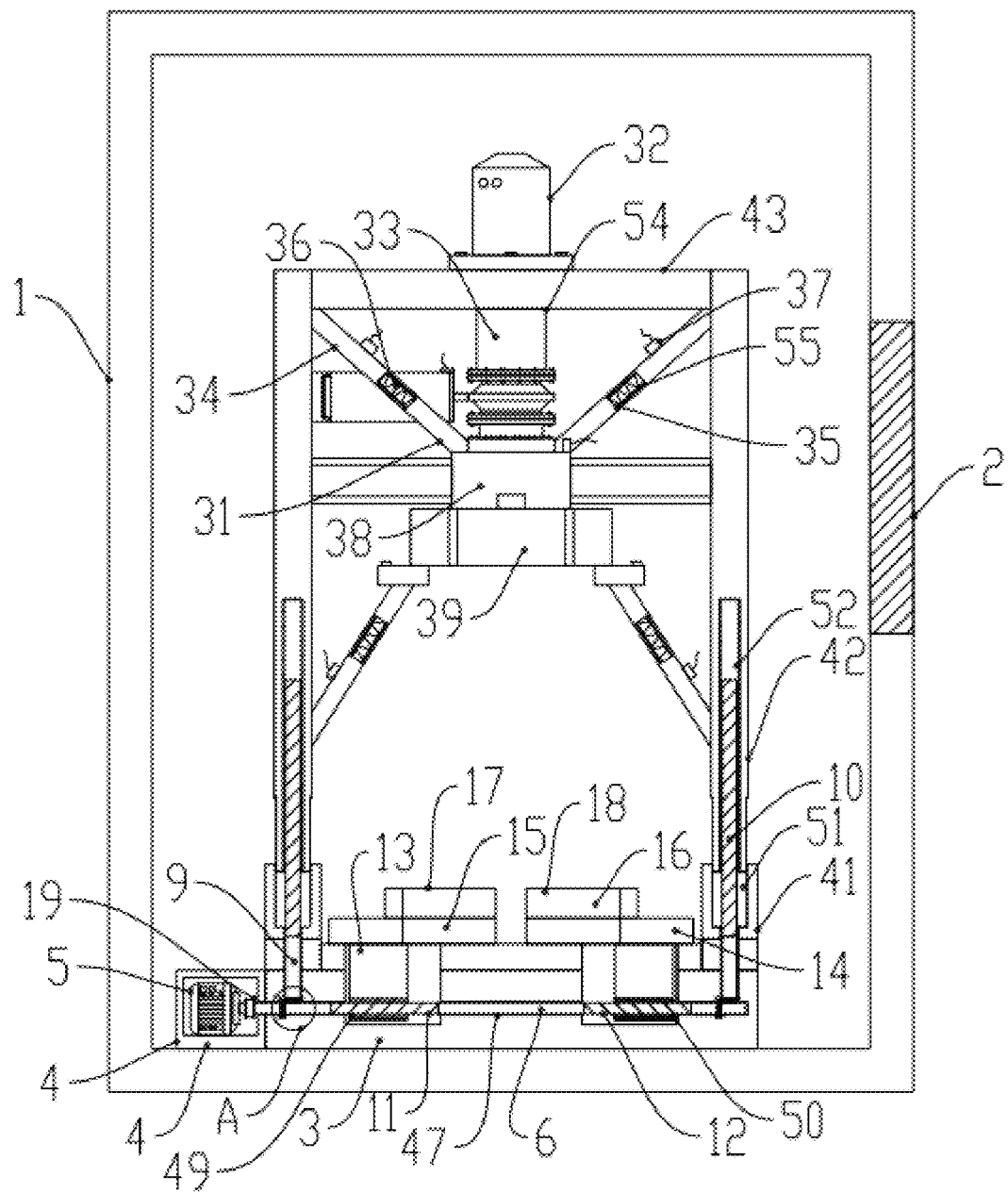
FIG. 5 is a main view of the present invention.

As shown in FIG. 5, a forward-rotating threaded groove I 49 is formed inside the right-moving sliding block 13, a reverse-rotating threaded groove I 50 is formed inside the left-moving sliding block 14, the forward-rotating screw rod 11 and the reverse-rotating screw rod 12 are respectively in threaded connection with an interior of the forward-rotating threaded groove I 49 and an interior of the reverse-rotating threaded groove I 50.

As shown in FIG. 5, a chute 51 is formed inside the first receiving block 41, the first receiving block 41 is slidably connected inside the chute 51, a forward-rotating threaded groove II is formed inside the second receiving block 42, and the threaded rod 10 is in threaded connection with an interior of the forward-rotating threaded groove II.

In this embodiment, the rotary blowout preventer is placed on the right-moving sliding seat 15 and the left-moving sliding seat 16, the motor 5 is started, the motor 5 drives the output shaft 6 to rotate, the output shaft 6 rotates to drive the forward-rotating screw rod 11 and the reverse-rotating screw rod 12 to rotate, the forward-rotating screw rod 11 and the reverse-rotating screw rod 12 rotate to drive the right-moving sliding block 13, the left-moving sliding block 14, the right-moving sliding seat 15, the left-moving sliding seat 16, the right-moving sealing block 17 and the left-moving sealing block 18 to move, sealing gaskets 20 are arranged on the right-moving sealing block 17 and the left-moving sealing block 18 to seal and clamp the bottom of the rotary blowout preventer body 40; and meanwhile, the output shaft 6 rotates to drive two driving sector gears 7 to rotate, the two driving sector gears 7 rotate to drive two driven sector gears 8 to rotate, the two driven sector gears 8 rotate to drive the rotating rod 9 to rotate, the rotating rod 9 rotates to drive the screw rod to rotate, the threaded rod 10 rotates to drive two second receiving blocks 42 to descend, which drives the connecting device body 39 to connect to the rotary blowout preventer body 40, so that the automation degree is high.

Embodiment 2

As shown in FIG. 1 to FIG. 13, based on the same concept as that of Embodiment 1, this embodiment further proposes that a first concave wheel 19 is fixedly sleeved on the outer peripheral surface of the output shaft 6, a follower rod 23 is rotatably mounted inside the test box body 1, a second concave wheel 21 and two symmetrically arranged driving bevel gears 24 are fixedly sleeved on an outer peripheral surface of the follower rod 23, a transmission belt 22 is mounted on outer peripheral surfaces of the first concave wheel 19 and the second concave wheel 21, a plurality of driven rods 25 uniformly distributed are rotatably mounted inside the test box body 1, two symmetrically arranged toothed belts 27 are jointly mounted on outer peripheral surfaces of the plurality of driven rods 25, driven bevel gears 26 are respectively and fixedly sleeved on the outer peripheral surfaces of the two driven rods 25, the two driving bevel gears 24 are respectively engaged with the two driven bevel gears 26, two symmetrically arranged sliding doors 28 are slidably mounted inside the test box body 1, a toothed block 29 is fixedly connected to a bottom of each of the sliding doors 28 through screws, the toothed belt 27 is engaged with the toothed block 29, and a magnetic strip 30 is arranged on one side of the sliding door 28. Through the arrangement of the structures such as the test box body 1 and the sliding doors 28, when the motor 5 is started, the transmission belt 22 is driven to rotate, the follower rod 23 is driven to rotate, the driving bevel gear 24 is driven to rotate, the driven bevel gear 26 is driven to rotate, the driven rod 25 is driven to rotate, the toothed belt 27 is driven to rotate, the toothed block 29 is driven to rotate, the sliding doors 28 are driven to move relatively, and when the two sliding doors 28 are connected, sealing is achieved by the magnetic strips 30, so that the safety of personnel is protected.

Figure 6:
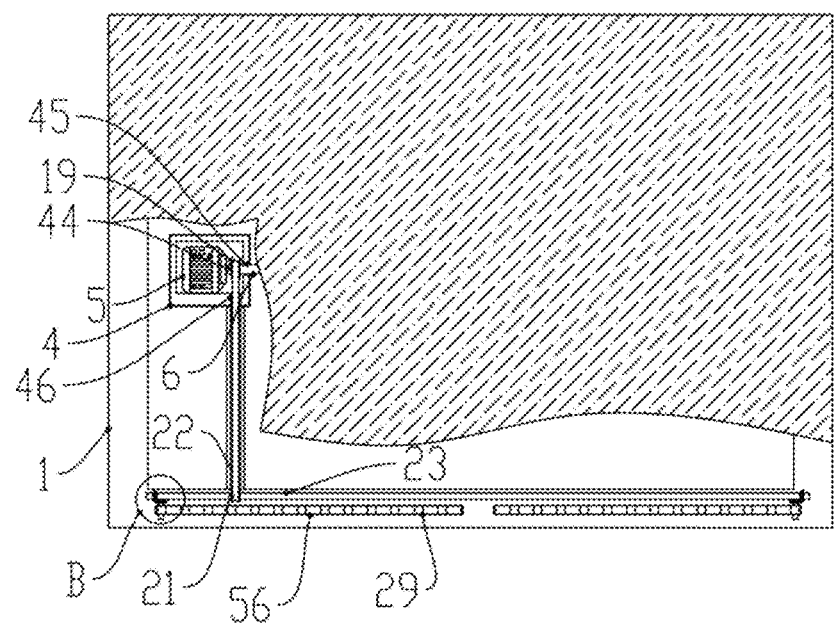
FIG. 6 is a top view of a base according to the present invention.
Figure 7:
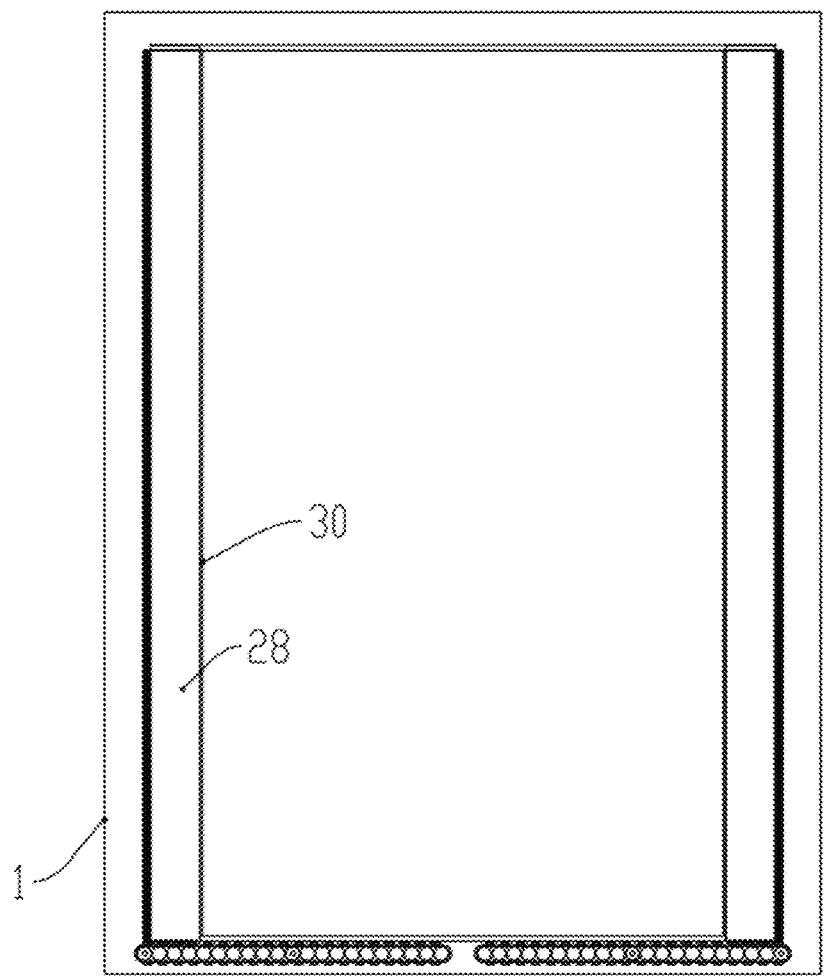
FIG. 7 is a main view of a sliding door according to the present invention.
Figure 8:
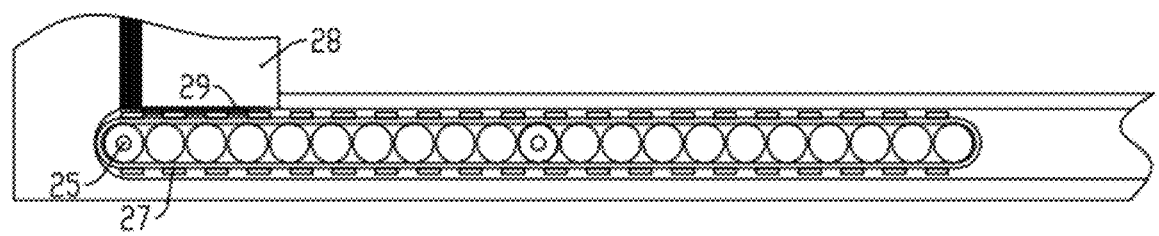
FIG. 8 is a main view of a toothed belt according to the present invention.
Figure 9:
FIG. 9 is a top view of a sliding door according to the present invention.
Figure 10:
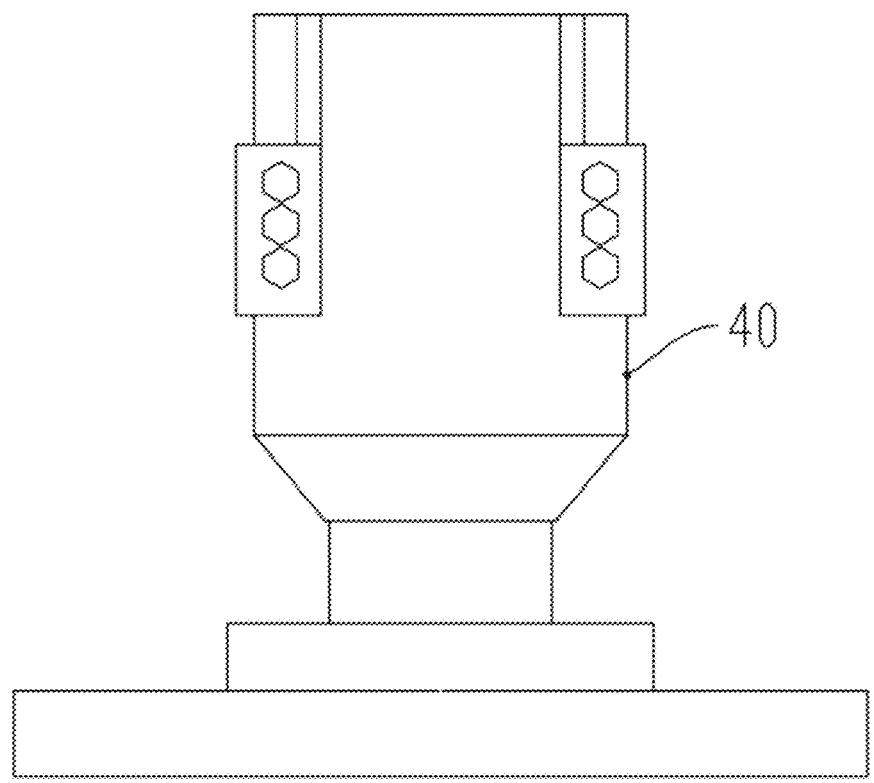
FIG. 10 is a left view of a rotary blowout preventer according to the present invention.
Figure 11:
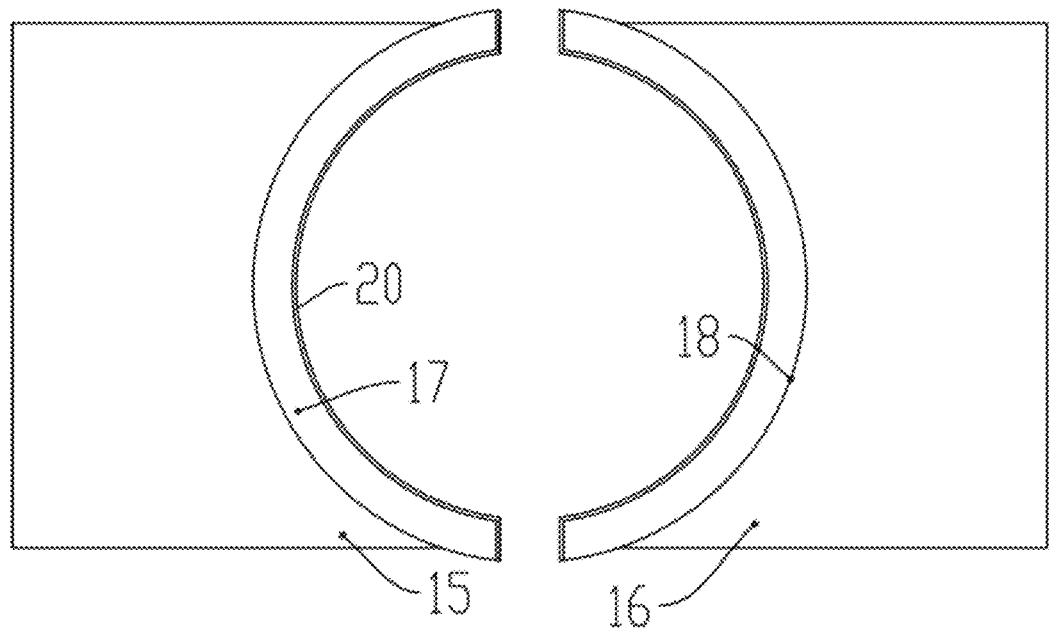
FIG. 11 is a top view of a right-moving sealing block and a left-moving sealing block according to the present invention.
Figure 12:
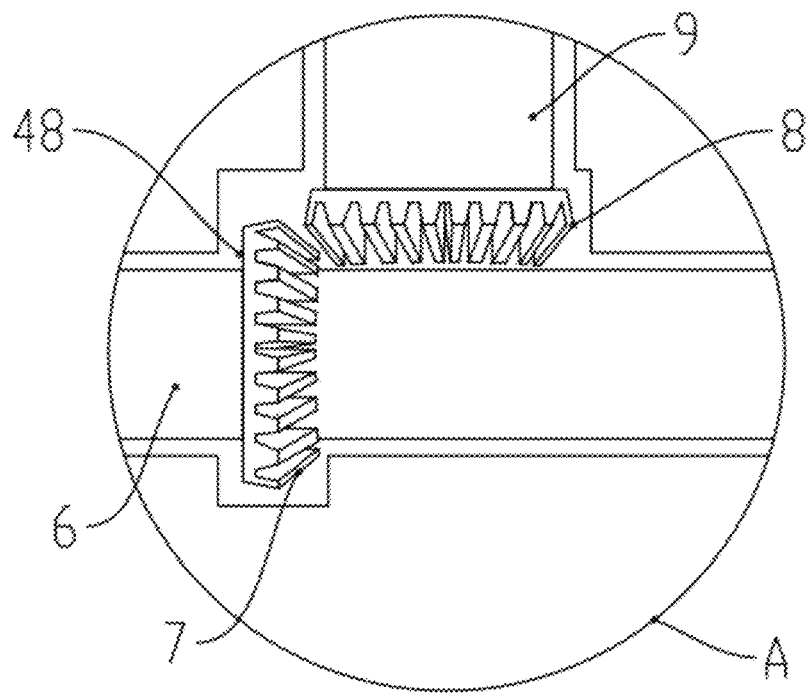
FIG. 12 is an enlarged view of a position marked A according to the present invention.
Figure 13:
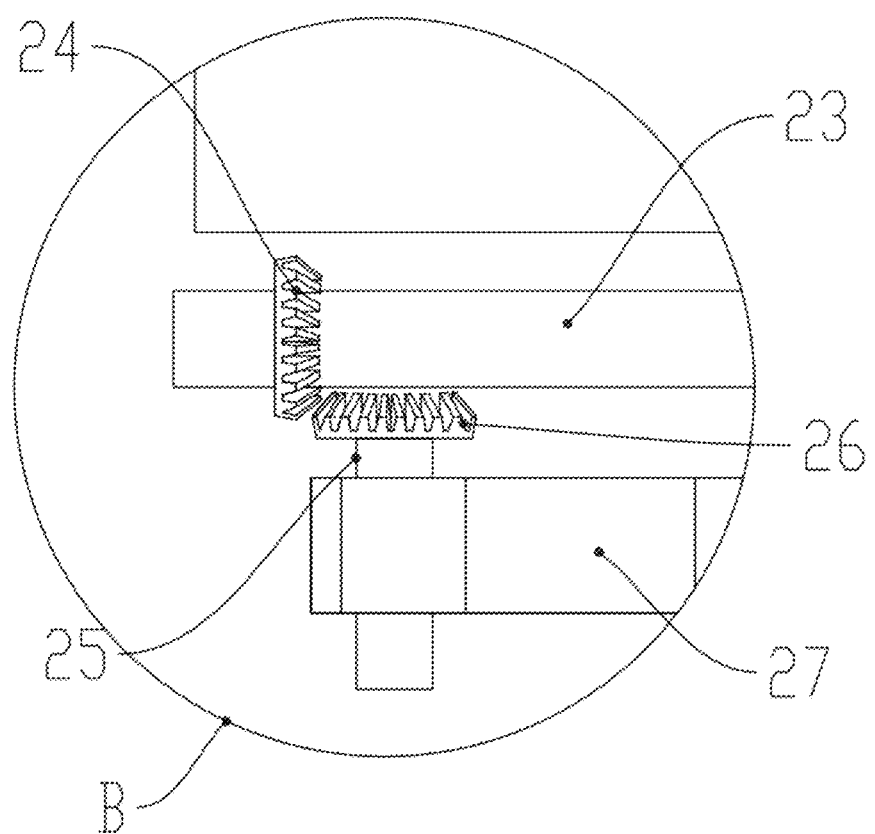
FIG. 13 is an enlarged view of a position marked B according to the present invention.

As shown in FIG. 5 to FIG. 6, a through groove 45 is formed inside the motor box 4, the output shaft 6 is rotatably mounted in the through groove 45, a square groove 46 is formed inside the motor box 4, and the transmission belt 22 passes through inside of the square groove 46.

In this embodiment, when the motor 5 rotates, the output shaft 6 drives the first concave wheel 19 to rotate, the first concave wheel 19 rotates to drive the transmission belt 22 to rotate, the transmission belt 22 rotates to drive the second concave wheel 21 to rotate, the second concave wheel 21 rotates to drive the follower rod 23 to rotate, the follower rod 23 rotates to drive two driving bevel gears 24 to rotate, the driving bevel gears 24 rotate to drive two driven bevel gears 26 to rotate, the driven bevel gears 26 rotate to drive two driven rods 25 to rotate, the driven rods 25 rotate to drive the toothed belt 27 to rotate, the toothed belt 27 rotates to drive the toothed blocks 29 to move forward, the toothed blocks 29 move forward to drive the sliding doors 28 to close tightly, and when the two sliding doors 28 are closed tightly, the sealing is achieved by the magnetic strips 30.

Embodiment 3

As shown in FIG. 1 to FIG. 5, based on the same concept as that of Embodiment 1, this embodiment further proposes that an observation window 2 is provided at one side of the test box body 1, the two second receiving blocks 42 are jointly and fixedly connected to a top connecting block 43 on one side through screws, a drive device body 32 is mounted on a top of the top connecting block 43, a power assembly 33 is mounted at an output end of the drive device body 32, a test mandrel 38 is mounted at a bottom of the power assembly 33, a connecting device body 39 is mounted at a bottom of the test mandrel 38, one side of each of the two second receiving blocks 42 is fixedly connected to two second connecting blocks 34 through screws, a vibration sensor 37 is mounted on one side of each of the four second connecting blocks 34, a clamping block 35 is slidably assembled in each of the second connecting blocks 34, a shock absorber 36 is mounted on an outer peripheral surface of the clamping block 35, the other end of each of the clamping blocks 35 is fixedly connected to a first connecting block 31 through screws, the other ends of the two first connecting blocks 31 are fixedly connected to two sides of the test mandrel through screws 38, and the other ends of the other two first connecting blocks 31 are fixedly connected to a bottom of the connecting device body 39 through screws. Through the arrangement of the structures such as the first connecting block 31 and the clamping block 35, when the drive device body 32 is subjected to the rotary test, vibration can be caused, and the first connecting block 31 can be loosened due to long-time vibration; in this case, the vibration can be relieved through the clamping blocks 35 and the shock absorbers 36 in the first connecting block 31 and the second connecting block 34, so that the entire operation life of the device is greatly prolonged.

As shown in FIG. 1 to FIG. 5, a sliding groove is formed inside the test box body 1, the sliding door 28 is slidably connected inside the sliding groove, a circular hole is formed inside the top connecting block 43, and the power assembly 33 passes through inside of the circular hole.

As shown in FIG. 5, a clamping groove is formed inside the first connecting block 31, the clamping block 35 is slidably connected inside the clamping groove, two heteroideus grooves are formed inside the test box body 1, and the toothed belt 27 is rotatably mounted inside the two heteroideus grooves.

In this embodiment, the arrangement of the test box body 1 ensures that the personnel can be effectively prevented from being injured when an accident occurs; the observation window 2 is provided at one side of the test box body 1, when a fault occurs, the internal condition can be observed in advance, and the injury caused by direct contact can be prevented; when the drive device body 32 is subjected to the rotary test, vibration can be caused, the first connecting block 31 can be loosened due to long-time vibration, in this case, the vibration can be relieved through the clamping blocks 35 and the shock absorbers 36 in the first connecting block 31 and the second connecting block 34, so that the entire operation life of the device is greatly prolonged.

A use method of a multifunctional rotary blowout preventer test device adopts the aforementioned multifunctional rotary blowout preventer test device and comprises the following steps:

S1: manually placing the rotary blowout preventer body 40 between the right-moving sliding block 13 and the left-moving sliding block 14;

S2: withdrawing personnel out of the test box body 1, remotely controlling to start the forward rotation of the motor, enabling the right-moving sliding block 13, the left-moving sliding block 14, the right-moving sliding seat 15, the left-moving sliding seat 16, the right-moving sealing block 17 and the left-moving sealing block 18 to move by the rotation of the motor 5, and clamping the rotary blowout preventer;

S3: when the motor 5 rotates, driving the second connecting block 34 to clamp into the first receiving block 41;

S4: after the connection and mounting are completed, remotely opening the drive device body 32, turning on the pressurizing unit, performing a rotary test on the interior, and observing the test condition from an external connector; and S5: after the test is completed, remotely controlling the reverse rotation of the motor 5, loosening the rotary blowout preventer body 40, and manually moving away the rotary blowout preventer body 40.

The above-mentioned contents are only preferred embodiments of the present invention and are not intended to limit the present invention. Any modification, equivalent substitution, improvement, etc., made within the spirit and principle of the present invention.

What is claimed is:

1. A multifunctional rotary blowout preventer test device, comprising: a test box body and a rotary blowout preventer body, wherein a base is fixedly connected inside the test box body with screws, two first receiving blocks are fixedly connected to a top of the base with screws, a motor box is fixedly connected to one side of the base with screws, a motor is mounted inside the motor box, an output end of the motor is connected to an output shaft through a coupler, two driving sector gears are fixedly sleeved on an outer peripheral surface of the output shaft, a forward-rotating screw rod and a reverse-rotating screw rod are fixedly connected to the output shaft with screws, a right-moving sliding block and a left-moving sliding block are respectively threaded on outer peripheral surfaces of the forward-rotating screw rod and the reverse-rotating screw rod, a left-moving sliding seat and a right-moving sliding seat are respectively and fixedly connected to tops of the right-moving sliding block and the left-moving sliding block with screws, a right-moving sealing block and a left-moving sealing block are respectively and fixedly connected to tops of the right-moving sliding seat and the left-moving sliding seat with screws, one side of each of the right-moving sealing block and the left-moving sealing block is provided with a sealing gasket, the two first receiving blocks are rotatably mounted one-to-one with two rotating rods, two driven sector gears are fixedly sleeved one-to-one on outer peripheral surfaces of the two rotating rods, the two driving sector gears are respectively engaged with the two driven sector gears, tops of the two rotating rods are fixedly connected one-to-one to two threaded rods with screws, and two second receiving blocks are threaded one-to-one on outer peripheral surfaces of the two threaded rods;

wherein an observation window is provided at one side of the test box body, the two second receiving blocks are jointly and fixedly connected to a top connecting block on one side with screws, a drive device body is mounted on a top of the top connecting block, a power assembly is mounted at an output end of the drive device body, a test mandrel is mounted at a bottom of the power assembly, a connecting device body is mounted at a bottom of the test mandrel, one sides of the two second receiving blocks are fixedly connected one-to-one to two of four second connecting blocks with screws, a vibration sensor is mounted on one side of each of the four second connecting blocks, four clamping blocks are slidably assembled one-to-one in the four second connecting blocks, a shock absorber is mounted on an outer peripheral surface of each of the four clamping blocks, one ends of the four clamping blocks are fixedly connected one-to-one to four first connecting blocks with screws, one ends of two of the four first connecting blocks are fixedly connected one-to-one to two sides of the test mandrel with screws, and one ends of other two of the four first connecting blocks are fixedly connected to a bottom of the connecting device body with screws.

2. The multifunctional rotary blowout preventer test device according to claim 1, wherein a first concave wheel is fixedly sleeved on the outer peripheral surface of the output shaft, a follower rod is rotatably mounted inside the test box body, a second concave wheel and two driving bevel gears are fixedly sleeved on an outer peripheral surface of the follower rod, a transmission belt is mounted on outer peripheral surfaces of the first concave wheel and the second concave wheel, a plurality of driven rods are rotatably mounted inside the test box body, two toothed belts are jointly mounted on outer peripheral surfaces of the plurality of driven rods, two driven bevel gears are respectively and fixedly sleeved on the outer peripheral surfaces of two of the plurality of driven rods, the two driving bevel gears are respectively engaged with the two driven bevel gears, two sliding doors are slidably assembled inside the test box body, two toothed blocks are fixedly connected one-to-one to bottoms of the two sliding doors with screws, the two toothed belts are engaged one-to-one with the two toothed blocks, and a magnetic strip is arranged on one side of each of the two sliding doors.

3. The multifunctional rotary blowout preventer test device according to claim 2, wherein a through groove is formed inside the motor box, the output shaft is rotatably mounted inside the through groove, a square groove is formed inside the motor box, and the transmission belt passes through the inside of the square groove.

4. The multifunctional rotary blowout preventer test device according to claim 3, wherein a sliding groove is formed inside the test box body, the two sliding doors are slidably connected inside the sliding groove, a circular hole is formed inside the top connecting block, and the power assembly passes through the inside of the circular hole.

5. The multifunctional rotary blowout preventer test device according to claim 3, wherein a clamping groove is formed inside each of the four first connecting blocks, the four clamping blocks are slidably connected inside the clamping groove, two heteroideus grooves are formed inside the test box body, and the two toothed belts are rotatably mounted one-to-one inside the two heteroideus grooves.

6. The multifunctional rotary blowout preventer test device according to claim 1, wherein a hole groove is formed inside the base, the output shaft is rotatably mounted inside the hole groove, two rotating grooves are formed inside the base, and the two driving sector gears and the two driven sector gears are rotatably mounted inside the two rotating grooves.

7. The multifunctional rotary blowout preventer test device according to claim 1, wherein a forward-rotating threaded groove I is formed inside the right-moving sliding block, a reverse-rotating threaded groove I is formed inside the left-moving sliding block, and the forward-rotating screw rod and the reverse-rotating screw rod are respectively in threaded connection with an interior of the forward-rotating threaded groove I and an interior of the reverse-rotating threaded groove I.

8. The multifunctional rotary blowout preventer test device according to claim 1, wherein two chutes are formed one-to-one inside the two first receiving blocks, the two first receiving blocks are slidably connected one-to-one inside the two chutes, a forward-rotating threaded groove II is formed inside the two second receiving blocks, and the two threaded rods are in threaded connection with an interior of the forward-rotating threaded groove I.

9. A test method using the multifunctional rotary blowout preventer test device according to claim 1, comprising the following steps:

S1: manually placing the rotary blowout preventer body between the right-moving sliding block and the left-moving sliding block;

S2: remotely controlling to start a forward rotation of the motor, enabling the right-moving sliding block, the left-moving sliding block, the right-moving sliding seat, the left-moving sliding seat, the right-moving sealing block and the left-moving sealing block to move by a rotation of the motor, and clamping the rotary blowout preventer;

S3: when the motor rotates, driving the four second connecting blocks to clamp into the two first receiving blocks, and connecting the connecting device body to a top of the rotary blowout preventer body;

S4: after the connection and mounting are completed, remotely opening the drive device body, turning on a pressurizing unit, performing a rotary test on the interior, and observing the test condition from an external connector; and S5: after the test is completed, remotely controlling a reverse rotation of the motor, loosening the rotary blowout preventer body, and manually moving the rotary blowout preventer body away.

\* \* \* \* \*